United States Patent
Viikari (10) Patent No.: US 10,140,566 B2
(45) Date of Patent: Nov. 27, 2018

(54) PASSIVE WIRELESS SENSOR

(71) Applicant: METSO OYJ, Helsinki (FI)

(72) Inventor: Ville Viikari, Espoo (FI)

(73) Assignee: METSO OYJ, Helsinki (FI)

( * ) Notice: Subject to any disclaimer, the term of this patent is extended or adjusted under 35 U.S.C. 154(b) by 0 days.

(21) Appl. No.: 15/108,118

(22) PCT Filed: Dec. 30, 2013

(86) PCT No.: PCT/FI2013/051214
§ 371 (c)(1),
(2) Date: Jun. 24, 2016

(87) PCT Pub. No.: WO2015/101695
PCT Pub. Date: Jul. 9, 2015

(65) Prior Publication Data
US 2016/0328637 A1    Nov. 10, 2016

(51) Int. Cl.
*G06K 19/07* (2006.01)
*H04Q 9/00* (2006.01)
*G06K 19/077* (2006.01)

(52) U.S. Cl.
CPC ..... *G06K 19/0723* (2013.01); *G06K 19/0717* (2013.01); *G06K 19/07796* (2013.01); *H04Q 9/00* (2013.01); *H04Q 2209/47* (2013.01)

(58) Field of Classification Search
CPC ........... G06K 19/0723; G06K 19/0717; G06K 19/07796; H04Q 9/00; H04Q 2209/47
USPC ................................. 235/492, 487
See application file for complete search history.

(56) References Cited

U.S. PATENT DOCUMENTS

| 6,378,360 | B1 | 4/2002 | Bartels |
| 6,480,699 | B1 * | 11/2002 | Lovoi ................ G06K 19/0701 |
| | | | 455/41.2 |
| 7,446,660 | B2 * | 11/2008 | Posamentier .......... G01K 1/024 |
| | | | 340/10.41 |

(Continued)

FOREIGN PATENT DOCUMENTS

| EP | 1732238 A1 | 12/2006 |
| JP | 2010-154195 A | 7/2010 |
| WO | 2011/121180 A1 | 10/2011 |

OTHER PUBLICATIONS

Sep. 15, 2014 International Search Report issued in International Patent Application No. PCT/FI2013/051214.

(Continued)

*Primary Examiner* — Paultep Savusdiphol
(74) *Attorney, Agent, or Firm* — Oliff PLC (57) ABSTRACT

The RFID sensor tag may include normal RFID circuits and functions (such as rectifier, modulator, logic and memory) as well as a resonator-based clock generator or oscillator. The oscillator is a stable resonator-based oscillator having a high Q value. The resonator-based oscillator is loaded with a sensor element which tunes the oscillation frequency, i.e. the oscillation frequency is sensitive to the measured quantity. Thereby, a passive RFID sensor with a resonator-based oscillator and a sensor element is provided, wherein the oscillation frequency can be made dependent on the sensor element if sensing is required. The concept is compatible for existing RFID tags and can enable the possibility to measure external quantities with-out reducing the read-out distance.

16 Claims, 5 Drawing Sheets

(56) References Cited

U.S. PATENT DOCUMENTS

| | | | |
|---|---|---|---|
| 2005/0052279 A1* | 3/2005 | Bridgelall | G06K 7/0008 340/10.1 |
| 2005/0093688 A1 | 5/2005 | Sinnett et al. | |
| 2005/0099269 A1* | 5/2005 | Diorio | G06K 19/0723 340/10.51 |
| 2005/0099270 A1* | 5/2005 | Diorio | G06K 19/0723 340/10.51 |
| 2006/0145855 A1* | 7/2006 | Diorio | G06K 19/0723 340/572.1 |
| 2007/0090926 A1* | 4/2007 | Potyrailo | G06K 19/0717 340/10.41 |
| 2007/0182549 A1 | 8/2007 | Qi | |
| 2007/0222590 A1* | 9/2007 | Posamentier | G01K 1/024 340/539.26 |
| 2008/0136646 A1 | 6/2008 | Friedrich | |
| 2009/0033462 A1* | 2/2009 | Kitayoshi | G06K 19/0723 340/10.1 |
| 2011/0291807 A1* | 12/2011 | Law | G01K 7/01 340/10.1 |
| 2012/0275489 A1* | 11/2012 | Lamy | G01K 7/32 374/184 |

OTHER PUBLICATIONS

Apr. 21, 2016 International Preliminary Report on Patentability issued in International Patent Application No. PCT/FI2013/051214.
Nadine Pesonen et al. "Smart RFID Tags". Development and Implementation of RFID Technology, ISBN 978-3-902613-54-7, Feb. 2009, I-Tech, Vienna, Austria, pp. 159-178.
Jul. 18, 2017 Supplementary European Search Report issued in European Patent Application No. 13 90 0820.

\* cited by examiner

PASSIVE WIRELESS SENSOR

FIELD OF THE INVENTION

The present invention relates to passive wireless sensors.

BACKGROUND OF THE INVENTION

Sensor is a device that transforms a measured quantity into a readable format, typically into an electrical signal. Nowadays, there are commercially available sensors virtually for any measurement purpose. According to the connectivity, sensors can be divided into wireless and wired sensors. Wired sensors are connected via wiring harnesses or cable assemblies to a reader device. Wireless sensors can be read without a physical connection to the sensor, and are often realized equipping the sensor with a radio transceiver. The transmitted radio signal is interpreted by a receiver which converts the wireless signal into a desired output. Wireless operation can be beneficial in many applications, where wired connection is difficult for example due to harsh operating conditions (like temperature and pressure, rotating parts, or cost and complexity of wiring. However, wireless sensors also have some drawbacks such as limited lifetime due to battery, limited read-out distance due to attenuation and interference, security issues because of the uncontrollable propagation of the signal and potentially low speed of communication. Based on the power source and communication principle, wireless sensors can be divided into three categories: active sensors, semi-passive sensors and passive sensors.

Active wireless sensors usually have both a radio transceiver and an on-board battery that is used to power up the transceiver. Active wireless sensors, having their own power sources, can use powerful transmitters and sensitive receivers. However, the battery on board limits the life time and also increases the size and weight. Due to more complex circuit, the price of an active sensor can be much higher than that of a passive sensor.

Semi-passive wireless sensors do not contain a radio transceiver, but are equipped with a battery. The battery is used to power up an integrated circuitry (IC) and enables the sensors to operate independently of the reader device or to maintain memory in the sensor. Semi-passive battery-assisted sensors utilize modulated backscattering technique for communication. This means that semi-passive sensors do not require any power from the on-board battery for transmission, but the sensor simply reflects back some of the power emitted by the reader device.

Unlike the active and semi-passive sensors, passive sensors do not require an on-board battery. Therefore they can be less complex, smaller, more inexpensive, and their lifetime is not limited by the power supply. The typical read-out distance of passive wireless sensors is between 10 cm and 3 m. Passive wireless sensors can be divided into four main categories: radio frequency identification (RFID) tags, electrical resonance circuit sensors, surface acoustic wave (SAW), harmonic sensors and intermodulation sensors.

SAW sensors utilize an interdigital transducer patterned on a piezoelectric substrate to convert the electromagnetic energy into a surface-acoustic wave (SAW). The SAW is then manipulated with acoustic reflectors, transformed back to electromagnetic energy, and radiated back to the reader device. The measured quantity affects the propagation properties of the SAW on the piezoelectric substrate. The need to use a piezoelectric material for the sensing element limits possible applications. In addition, SAW tags only enable hard-coded identification (ID), and they do not provide any memory to the chip.

Resonance sensors consist of a simple resonance circuit, whose resonance is sensitive to a measured quantity. These sensors require near-field coupling to the reader, which limits their read-out distance to a few centimeters.

Harmonic sensors, when illuminated by a reader with one or many tones, scatter back the sensor data at a harmonic frequency. In other words, the sensor mixes the tones (nonlinearity is needed in order to set mixing) and reflects a signal containing harmonic products, which are offset from the reader frequencies. The harmonic reader receives the harmonic of the transmitted frequencies, and the received data can then be processed to find the exact location and mobility of the object causing the generation of this harmonic. The concept was first proposed for telemetry. Recently, an intermodulation communication principle for sensing applications has been developed. In this principle, the sensor is actuated by two closely located frequencies, and the sensor data is scattered back at an intermodulation frequency. This approach enables a wireless read-out of a generic sensor element (such as a MEMS sensor) across a very large distance (even tens of meters). The sensors can also be equipped with an ID. However, the concept requires a special reader, and it does not provide memory or anti-collision protocol. Such approach is disclosed in WO2011/121180 and U.S. Pat. No. 6,378,360.

Figure 1:
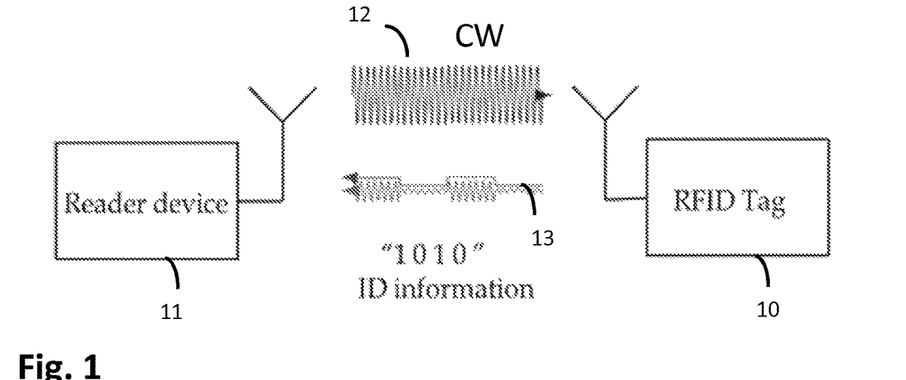
FIG. 1 illustrates backscattering communication principle in an RFID system.

RFID is an identification technology that uses radio waves to communicate between tags and a reader and it is used to identify items. There are a few advantages of RFID over optical barcode identification such as no line-of-sight is required between the reader device and the tag, and the RFID reader can also read hundreds of tags at a time. Passive RFID tags utilize the modulated backscattering communication principle which is illustrated in FIG. 1. When a tag 10 communicates with an RFID reader 11, it modulates the received signal 12 and reflects a portion of it 13 back to the reader. A typical passive tag consists of an antenna connected to an application specific microchip. When wirelessly interrogated by an RFID transceiver, or reader, the RFID tag antenna receives power and RF signals from the RFID reader and provides them to the chip. The chip processes the signals and sends the requested data back to the RFID reader. The backscattered signal is modulated according to the transmitted data. The highest operation frequency and read-out distance of RFID are limited by the rectified power for the integrated circuit (IC) and are a few GHz and 5-10 m, respectively.

RFID is mostly used for identification. RFID tags are equipped with a rewritable memory, which enables the reusability features of RFID tags, but they are not useful for measuring external quantities. RFID has also been shown to be suitable for sensing by equipping an RFID tag with an external sensor and digital logic to read the external sensor. The advantage of this approach is that it would use a generic sensor element and thus would be well suited for a very broad range of applications. In this approach, however, an additional A/D converter and digital circuitry has to be included to the tag in order to enable sensor read-out. Increased power consumption due to the additional electronics reduces the read-out range significantly (e.g., from 10 m to 0.3 m with an 8-bit A/D converter). An additional sensor element further increases power consumption. Implementation considerations of the A/D converter and additional digital circuits are discussed in [1]: Chapter 9 "Smart RFID Tags", in the book "Development and Implementation of RFID Technology", ISBN 978-3-902613-54-7, February 2009, I-Tech, Vienna, Austria. http://www.intechopen.com/books/development and implementation of rfid technology.

To summarize, the current passive wireless sensor techniques have several limitations. No single technique can simultaneously provide sensing, the sophisticated features of the RFID technology, such as identification and anti-collision, and large read-out distance.

BRIEF DESCRIPTION OF THE INVENTION

An object of the present invention is to provide a passive wireless sensor that can provide sensing, sophisticated functionality, and large read-out distance.

The objects of the invention are achieved by a passive wireless sensor and a system according to the attached independent claims. The preferred embodiments of the invention are disclosed in the dependent claims.

An aspect of the invention is a passive wireless transponder, comprising an antenna, a rectifier, an oscillator and a modulator for communication with a backscattering principle to provide to radio frequency identification (RFID) features, and a sensing element for sensing a predetermined variable, wherein the oscillator is a resonator-based oscillator (e.g., LC-oscillator, RLC-oscillator, crystal oscillator, MEMS resonator based oscillator), and the sensing element is connected to the oscillator, and a modulation frequency output from the oscillator is arranged to be dependent on a sensed value of the predetermined variable.

In an embodiment, the transponder further comprises a control logic and/or a memory for radio frequency identification (RFID) features, such as identification and anti-collision.

In an embodiment, major part of the transponder is implemented with an integrated circuit technique, and wherein the sensing element may be an external component, such as a MEMS sensor. In general, resistive, capacitive, and inductive sensor elements can be used because they can all affect the resonance of an electrical resonator. Examples of resistive sensors include temperature and strain sensors. Inductive sensors include ultrasonic transducers (can be inductive at certain excitation frequencies), proximity sensors, and inductive relays. Other variables, such as voltage or force can be transformed into a capacitance, for instance, using a varactor diode and piezoelectric material.

In an embodiment, major part of the transponder is implemented with an integrated circuit technique, and wherein at least part of the oscillator comprises an external component, such as an external resonator, an external MEMS resonator, an external inductor.

In an embodiment, major part of the transponder is implemented with an integrated circuit technique, and wherein the sensing element and a resonator part of the oscillator are implemented with a resonant sensors or a MEMS resonant sensor.

In an embodiment, the oscillator can be a Collpitts oscillator, Meissner oscillator, Armstrong oscillator, or Hartley oscillator. In addition, more complex oscillator structures can be utilized.

In an embodiment, the oscillator is loaded with many switchable sensor elements. One sensor element can be selected to load the oscillator at a time and thus affect the oscillation frequency. This way the transponder can be equipped with multiple sensors which can be read individually. The transponder has a logical circuit that can switch on certain sensing element and switch off all the rest. The reader device can send a command to the transponder on what sensor is switched on.

In an embodiment, the LC or RLC oscillator is a Collpitts oscillator which comprises an active amplifying device, a capacitive divider, and a feedback inductance.

In an embodiment, a voltage level of the modulation frequency output from the LC or RLC oscillator is dependent of a capacitive divider ratio of the capacitive divider.

In an embodiment, the passive wireless transponder comprises one or more of a high pass filter between the antenna and the rectifier, a low pass filter between a DC output of the rectifier and an input of the oscillator, and a band pass filter between an output of the oscillator and an input of the modulator.

In an embodiment, the rectifier comprises a rectifier diode D1, and wherein the rectifier diode also provides a mixer of the modulator.

In an embodiment, in the modulated backscattered signal comprises sidebands that are offset from an interrogation frequency by the oscillation frequency which is dependent on the sensed value of the predetermined variable.

An aspect of the invention is a system comprising an RFID reader and at least one passive wireless transponder according to embodiments of the invention.

The passive wireless sensor concept according to embodiments of the invention can provide:
1) all sophisticated features of the RFID (memory, ID, and anti-collision),
2) a possibility to measure an external quantity, such as pressure or acceleration using a generic, external sensing element (e.g. a MEMS sensor),
3) very large read-out distance (>10 m), and
4) compatibility with existing RFID readers.

BRIEF DESCRIPTION OF THE DRAWINGS

In the following the invention will be described in greater detail by means of preferred embodiments with reference to the drawings, in which.

DETAILED DESCRIPTION OF THE INVENTION

Figure 2:
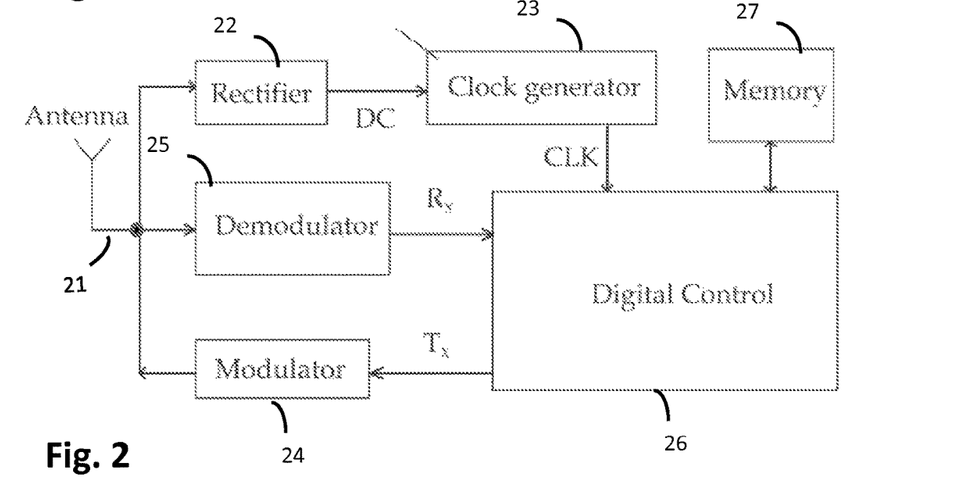
FIG. 2 is a functional block diagram illustrating an example of a an RFID tag architecture.

FIG. 2 shows a functional block diagram illustrating an example of radio frequency identity (RFID) transponder (tag) architecture. In the illustrated example the RFID tag 10 may comprise an antenna 21 directly matched to the tag's front end impedance (matching circuit is not shown) to communicate with a RFID reader 11; an analogue RF front end that may typically contain rectifier circuitry 22 to convert RF power into a direct current (DC), a clock generator or oscillator 23, a modulator 24 and a demodulator 25. There may also be a logic part or a digital control module 26 that may be configured to provide desired functions, such as to handle interrogating commands, execute the anti-collision protocol, perform the data integrity check, run memory read-write operations, and perform output control and data flow. The logic implementation usually follows a defined standard and a certain associated protocol. Further, memory storage 27 may be provided. Depending on a user's requirement, non-volatile memory storage may be needed if both read/write capability is implemented.

Figure 3:
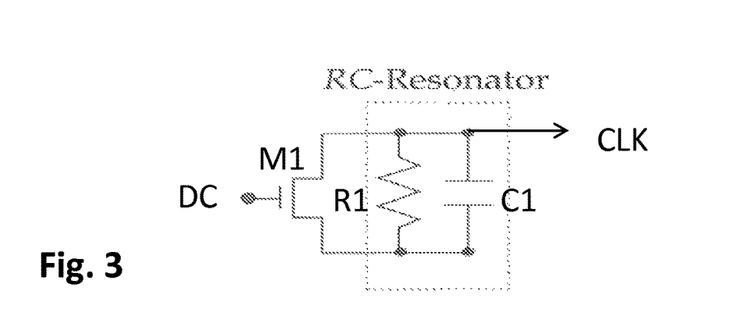
FIG. 3 is a circuit diagram illustrating an RC oscillator.

As discussed above, the passive RFID tags utilize the modulated backscattering principle for communication. When a tag communicates with a reader, it modulates the received signal and reflects a portion of it back to the reader. In prior art RFID systems, the modulation frequency is the same as the clock frequency of the tag. In prior art RFID systems, the clock frequency generation 23 is realized with an inefficient RC-oscillator whose frequency is relatively unstable. Therefore, a relatively large band (40 or 160 kHz, ±15%) is allocated for the modulated response of the tags. The modulation frequency itself does not carry any information in current systems, and the spectral efficiency is poor (information band can be as low as one tenth of the overall band). The RC-oscillator also consumes relatively large power. An example of an RC oscillator containing a transistor M1, a resistor R1 and a capacitor C1 is illustrated in FIG. 3.

Current passive wireless sensors cannot simultaneously provide sensing and the sophisticated features of the RFID technology. This can be enabled by equipping an RFID tag with a resonator-based oscillator (LC-oscillator, RLC-oscillator, crystal oscillator or similar) and sensor element in order to enable the sophisticated features of RFID and the possibility to measure external quantities without reducing the read-out distance.

According to one embodiment of the invention the unstable RC-oscillator in an RFID tag device is replaced with a stable resonator-based oscillator having a high Q value, and the RFID is provided with a sensor element in order to enable the sophisticated features of RFID and the possibility to measure external quantities without reducing the read-out distance. Examples of resonator-based oscillators include Hartley, Collpits, Armstrong, and Meissner LC-oscillators or RLC-oscillators, different crystal oscillators, and oscillators based on MEMS (microelectro-mechanical systems), SAW (surface acoustic wave), and BAW (bulk acoustic wave) resonators. Exemplary embodiments described herein for a LC-oscillator can be similarly applied to a RLC-oscillator. It should be appreciated that a LC-oscillator will become as a RLC-oscillator, if a minimal amount resistance R is introduced into the LC-oscillator. In practice, all LC-oscillators can be considered as RLC-oscillators, because there is always resistance R present in the inductor L. On the other hand, it is preferable to minimize the resistive component R, because the resistive component R increases the power consumption and reduces the read-out distance. The invention can also be used with an RC-oscillator with reduced measurement resolution. The advantage of an RC-oscillator is that it can be integrated.

The resonator-based oscillator, first of all, enables a huge improvement to the spectral efficiency of the RFID enabling simultaneous reading of numerous tags at different modulation frequencies (state-of-the-art readers already enable carrier frequency multi-access scheme, which should not be confused with the modulation frequency multi-access scheme). Furthermore, the resonator-based oscillator can be loaded with a sensing element which tunes the oscillation frequency, i.e. the oscillation frequency becomes sensitive to the measured quantity. In other words, a passive RFID sensor with a resonator-based oscillator and a sensor element is provided, wherein the oscillation frequency can be made dependent on the sensor element if sensing is required. Therefore, this concept is compatible for existing RFID tags and can enable the possibility to measure external quantities without reducing the readout distance.

It is also possible to combine the resonator and sensor for example by designing a MEMS resonator in such a way, that its resonance is sensitive to a measured quantity. For example, the resonance frequency of a MEMS resonator can be made sensitive to temperature and strain and thus these parameters can be obtained from the resonance frequency.

Embodiments of the invention offer many benefits. First, an RFID sensor tag can be interrogated with existing RFID readers, because they already measure the clock frequency (that is, the modulation frequency) of the tag. No hardware modification is required to existing RFID readers to communicate with a sensor RFID according to embodiments of the invention. RFID sensor tags can also be equipped with external sensor elements without any reduction in the read-out distance. In fact, the power consumption of an RFID tag has slightly decreased when an RC-oscillator is replaced with an oscillator based on a resonator (e.g. LC, RLC, quartz crystal, SAW or BAW resonator or MEMS resonator).

Figure 4A:
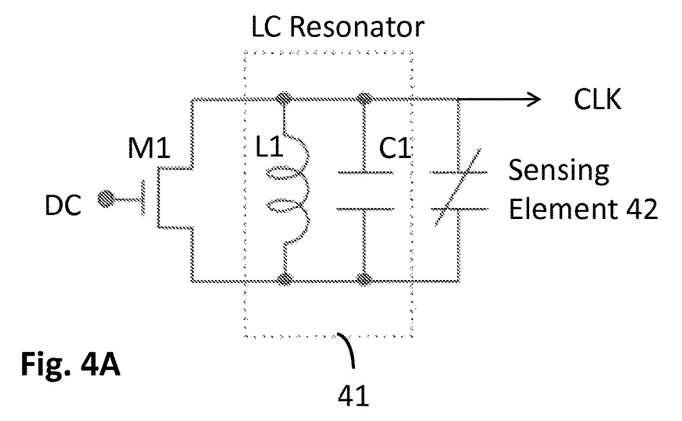
FIG. 4A illustrates an example of a LC oscillator.

An example of a resonator-based LC oscillator containing a transistor M1 and an LC resonator 41 with a parallel connection of inductor L1 and a capacitor C2 is illustrated in FIG. 4A.

Figure 4B:
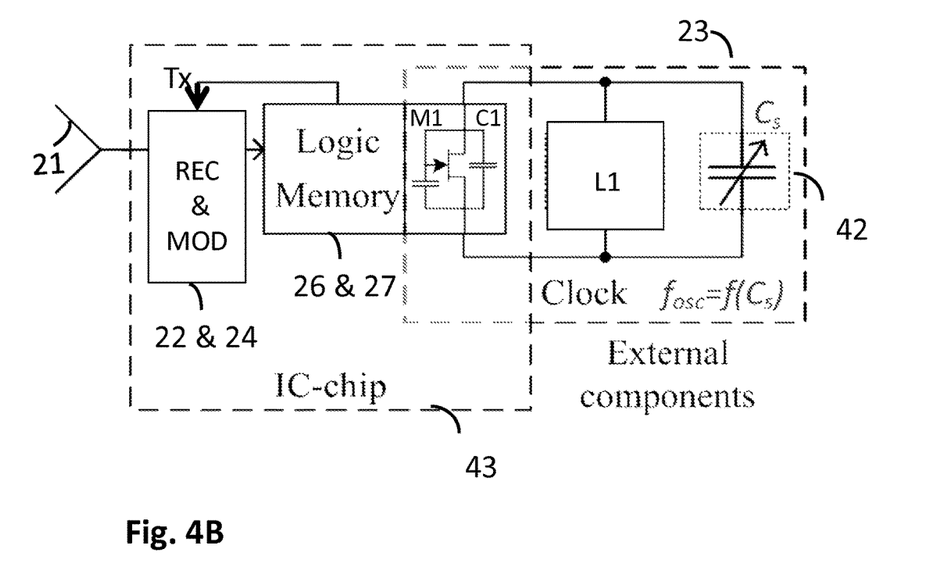
FIG. 4B illustrates an example of a RFID sensor tag implemented with an integrated circuit chip and external components.

FIG. 4B illustrates an example of a RFID sensor tag wherein the normal RFID circuits and functions (such as rectifier 22, modulator 24, logic 26 and memory 27) as well as part of the clock generator 23 (such transistor M1 and capacitor C1) are implemented on an integrated circuit chip 43, whereas part of the oscillator 23 (such an inductor L1 or a resonator) and a sensing element 42 (such capacitive sensor Cs) may be implemented as external components connected to the integrated circuit chip 43. Alternatively, the entire resonator (such as the resonator 41) may be implemented with one or more external components, or some other kind of configuration may be employed. The concept allows utilizing potentially low-cost inductors, resonators and sensors or resonant sensors. For example, MEMS resonators and sensor or MEMS resonant sensors may be applicable. MEMS resonant sensor is a resonating device, whose resonance is made sensitive to a measured quantity. The measured quantity is obtained by measuring the resonance of the device. The cost of MEMS resonators and sensors is in the range of 0.5-2 €, and that of mass produced RFID chips around 0.1 €. As a comparison, mass produced high frequency (HF) and near-field-communication (NFC) RFID tags with a sensor interface costs $2.59-3.46.

Figure 4C:
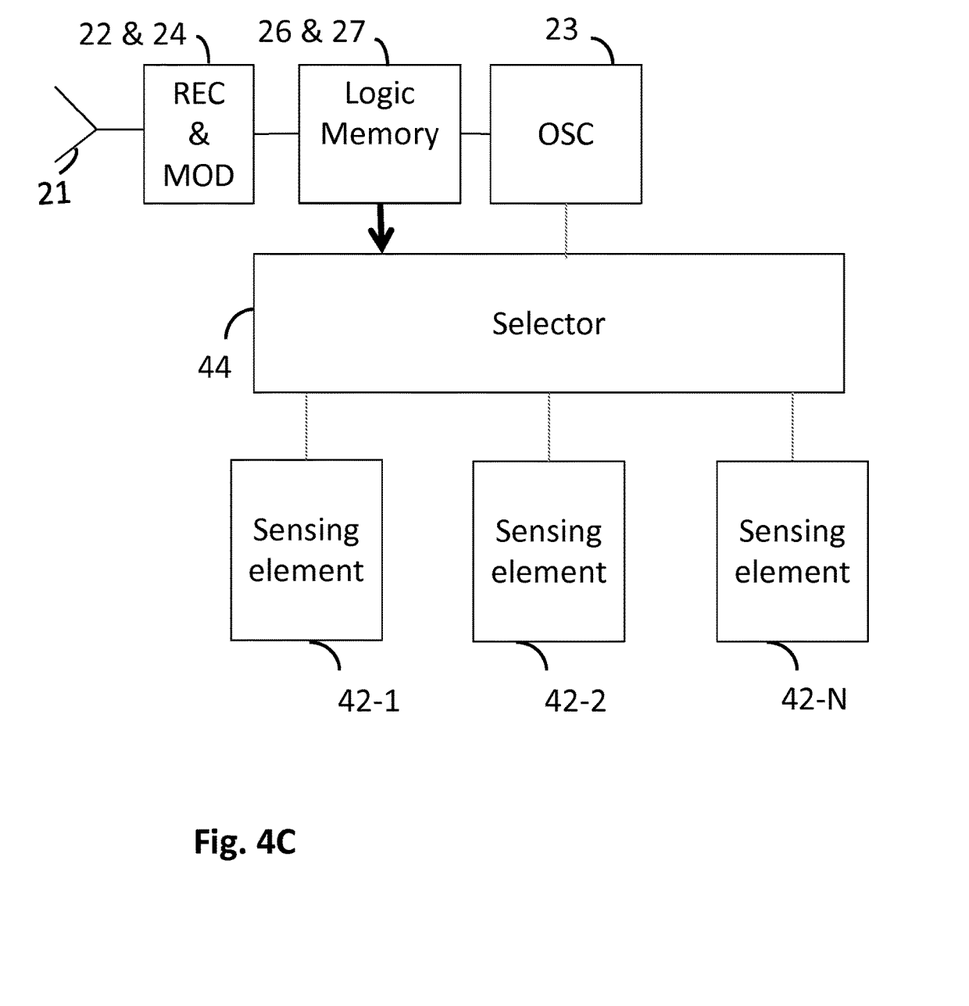
FIG. 4C illustrates an example of a RFID sensor tag provided with two or more sensing elements.

FIG. 4C illustrates an example of a transponder or a RFID sensor tag provided with two or more sensing elements 42-1, 42-2, ..., 42-N. The RFID sensor tag may include normal the normal RFID circuits and functions (such as rectifier 22, modulator 24, logic 26 and memory 27) as well as a resonator-based clock generator or oscillator 23, such as those described in other exemplary embodiments. Sensing elements 42-1, 42-2, . . . , 42-N can be selectively, one at time, enabled to load the oscillator 23 such that the modulation frequency output from the oscillator 23 is dependent on a sensed value of the predetermined variable of the enabled sensing element 42. In other words, one sensing element can be selected to load the oscillator at a time and thus affect the oscillation frequency. This way the transponder can be equipped with multiple sensors which can be read individually. The transponder may have a logical circuit that can switch on certain sensing element and switch off all the rest. For example, the transponder may comprise a selector 44, such as a switch circuit or an analog multiplexer arranged to selectively connect one and disconnect the remaining ones of the plurality of sensing elements 42-1, 42-2, . . . , 42-N to and from the oscillator 23. The selective enabling, switching or connecting may be carried out according to a predetermined sequence. Alternatively, a reader device can send a command to the transponder on which sensing element 42-1, 42-2, 42-N is switched on. For example, the logic 26 may receive a selection command from the reader and control the selector 44 accordingly.

Figure 5A:
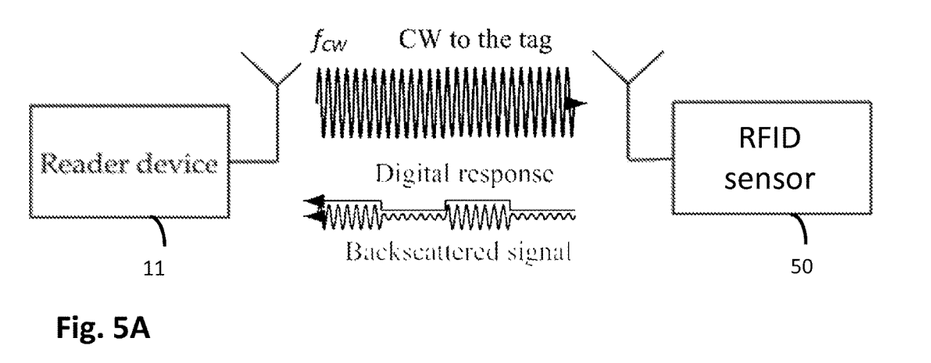
FIG. 5A is a system diagram that illustrates the communication principle for a RFID sensor according to exemplary embodiments of the invention.
Figure 5B:
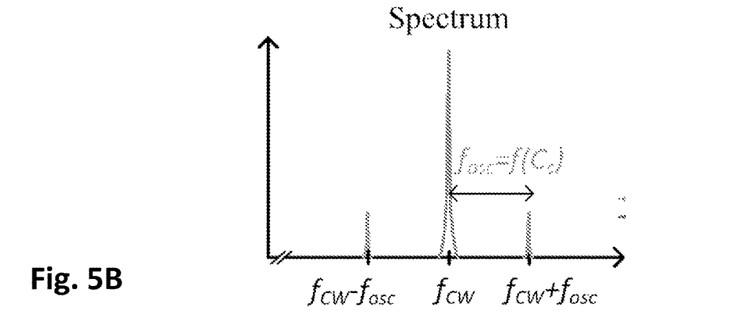
FIG. 5B is a spectral graph that illustrates the communication principle for a RFID sensor.

FIGS. 5A and 5B illustrate the communication principle for a RFID sensor according to exemplary embodiments of the invention. In the FIGS. 5A and 5B, $f_{CW}$ and $f_{OSC}$ represent the carrier frequency and oscillation frequency, respectively. The RFID sensor is actuated using an RF CW signal transmitted from the reader 11. First, the RF signal is converted to DC voltage by a rectifier 22 (such as rectifier 22 in FIG. 4B). The rectified voltage powers up an oscillator 23, which produces a low frequency sinusoid $f_{OSC}$ at its output. Finally, the oscillation signal $f_{OSC}$ is fed to the modulator 24 to realize the backscattering principle. The modulator 24 modulates the signals, and those going back to the antenna 21 depend on the matching between the antenna and the rectifier 21/modulator 24. As a consequence, there are sidebands $f_{CW}-f_{OSC}$ and $f_{CW}+f_{OSC}$ in the signal reflected from the sensor. The sidebands are offset from the carrier $f_{CW}$ by the oscillation frequency $f_{OSC}$.

Figure 6:
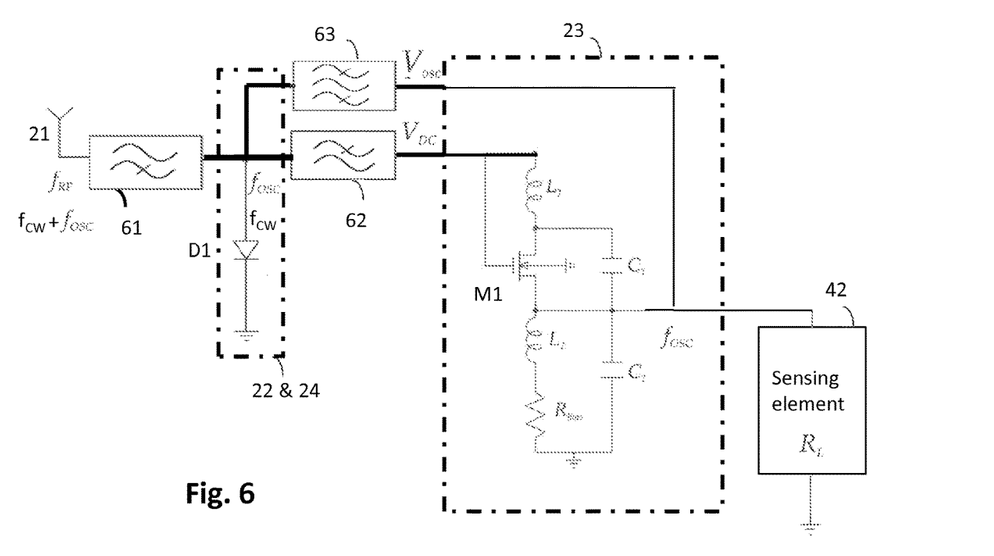
FIG. 6 is a block and circuit diagram illustrating an RFID sensor device according to according to exemplary embodiments of the invention.

For illustrative purposes, exemplary embodiments of the invention are described with only main parts: an antenna 21, a rectifier 22, an LC-oscillator 23, a modulator 24 and a sensing element 42, as illustrated in FIG. 6. The antenna 21 matched to the rectifier 22 with a suitable matching circuit as well known to a person skilled in the art. Moreover, there may be a high pass filter 51 between the antenna 21 and the rectifier 22, a low pass filter 52 between the DC output of the rectifier 21 and the input of the low-frequency oscillator 23, and a band pass filter 53 between the output of the oscillator 23 and the input of the modulator 24.

A passive RFID sensor 50 typically harvest all the energy needed for its operation from the interrogation signal of the reader device 11. However, it is also possible to attach other energy harvesters to the presented sensor device to achieve an increased read-out range. Possible energy harvesters include photovoltaic and solar cells, thermocouples, vibration energy harvesters, wind turbines (also in microscopic level) and acoustic harvesters. The reader device 11 illuminates the tags with a continuous wave (CW), and the RFID sensors utilize a voltage rectifier 22 to produce the supply voltage $V_{DC}$ needed for the operation. Under small-signal conditions, in which the RFID sensors often operate at large distances, the efficiency of the rectifier is proportional to the peak AC voltage. Rectifier 22 may be based on a non-linear element, such as a diode D1, and it is used to convert AC voltage into DC. A most simple rectifier may contain a zero bias Schottky diode D1. The antenna 21 may be isolated from the rectifier diode D1 with high pass filter 51, such as a DC block capacitance, and the oscillator 23 may be isolated from the antenna 21 and the rectifier 22 at RF with the low pass filter 52, such as an RF choke, in order to prevent RF energy from dissipating in the DC load, i.e. in the oscillator 23.

As was discussed earlier, the sensor utilizes the modulated backscattering principle for communication. In exemplary embodiments, the modulated backscattering may be realized by applying the oscillator output $f_{OSC}$ to the rectifier 22. In other words, rectifier diode D1 is also used as a part of the modulator 24. In the modulator 24, the rectifier diode D1 is used as a mixer. The band-pass filter 63, such as an RF choke, allows the oscillator frequency to $f_{OSC}$ pass through and stop other frequencies. The oscillation signal $f_{OSC}$ modulates the RF impedance of the rectifier diode D1. The voltage at the oscillation frequency $f_{OSC}$ mixes with the original input frequency $f_{CW}$, generating signals at the sum ($f_{CW}+f_{OSC}$) and difference ($f_{CW}-f_{OSC}$) frequencies. As a consequence, there are sidebands in the signal reflected from the sensor 50. The reflected power by the RFID sensor depends on the diode parameters, RFID sensor input power ($V_{DC}$), oscillator output voltage $V_{OSC}$ and the internal resistance of the antenna 21, for example.

When used in a passive wireless sensor, an oscillator 23 must produce a large output voltage and its power consumption must be small. The power consumption of an RFID sensor 50 mainly takes place in the oscillator circuit 23 to generate the oscillator output voltage, on which the sensor read-out distance depends. Therefore, power consumption of an RFID sensor 50 can be made arbitrary small by designing an oscillator which can operate with ultra-low supply voltage. Moreover, larger read-out distance of the RFID sensor 50 can be achieved by producing a large oscillator output voltage. The previous analysis was made under an assumption that the sensor is not equipped with digital IC electronics. When digital electronics are included, the read-out distance may be limited due to the power consumption of the digital circuitry.

Oscillator circuit 23 can be implemented with various oscillator topologies. Examples of classic oscillator topologies include Collpitts oscillator, Meissner oscillator, Armstrong oscillator, and Hartley oscillator. The Colpitts oscillator is perhaps the most widely used oscillator in the history, widely used in commercial signal generators up to 100 MHz and also because it is easy to implement. In exemplary embodiments a simple Colpitts oscillator topology has been chosen for description without intending to restrict the invention to this oscillator topology.

Referring to FIG. 6, the exemplary oscillator 23 may be implemented by a low voltage Colpitts oscillator. The exemplary oscillator circuit contains common-gate amplifier, including a transistor M1, a capacitive divider composed of capacitors C1 and C2, and a feedback inductor L1.

The power consumption of an oscillator depends heavily on the semiconductor fabrication process and transistor technology type. Common processes are silicon (Si), gallium arsenide (GaAs) and silicon germanium (SiGe). Typical technologies used are bipolar junction transistor (BJT), field-effect transistor (FET) and heterojunction bipolar transistor (HBT). The power consumption of an oscillator also depends on the bias circuit and threshold voltage of the transistor. The metal-oxide-semiconductor field-effect transistor (MOSFET) is a type of field-effect transistor (FET). As compared to BJTs, a MOSFET can be made quite small and its operation requires relatively low power. Therefore, in the exemplary embodiments, a MOSFET transistor M1 with a very low threshold voltage, such as ALD 800, may be employed.

For ultra-low-voltage operation, the control terminal of MOSFET transistor M1 are connected to the supply voltage $V_{DC}$ directly, the drain terminal is connected to the supply voltage $V_{DC}$ via the feedback inductor L1, and the source terminal is connected to the ground via a series connection of the inductor L2 and the biasing resistance $R_{bias}$. The sensing element 42 may provide a load resistance $R_L$ at the output of the oscillator. The required feedback may be achieved with a capacitive divider formed by a series connection of the capacitors C1 and C2 connected between the drain terminal and the ground. The middle node between C1 and C2 is connected to the source terminal and provides the output of the oscillator. The capacitive divider C1-C2 determines ratio between the oscillator voltages $V_{DC}$ and $V_{OSC}$.

The equivalent capacitance $C_{eq}$ and capacitive division ratio $n_c$ can written as $$C_{eq} = \frac{C_1 C_2}{C_1 + C_2}.$$

$$n_c = \frac{V_{osc}}{V_{DC}} = 1 + \frac{C_1}{C_2}.$$

Figure 7:
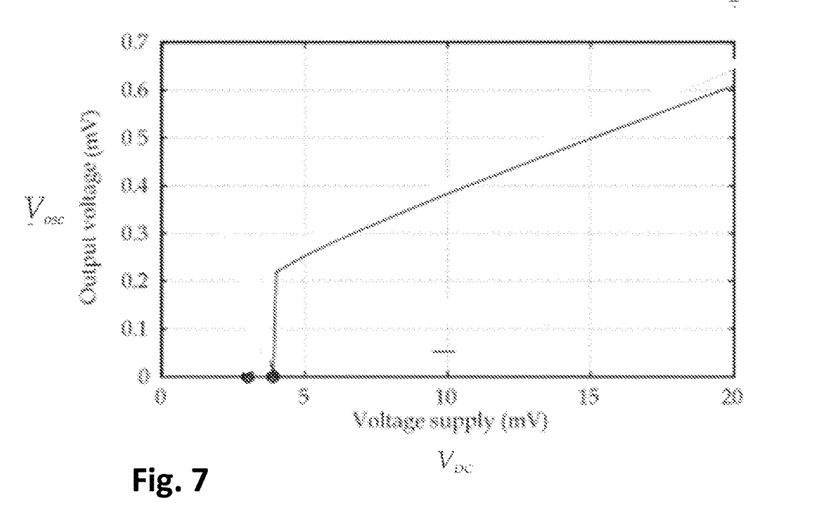
FIG. 7 is a graph illustrating the oscillation output voltage as a function of input voltage supply.

FIG. 7 illustrates the oscillation output voltage as a function of input voltage supply with parameter values listed in Table 1 below and with the aim of generating a signal at 100 kHz. The oscillator required a minimum supply voltage of 4 mV to start the oscillation which makes it feasible for use in a passive wireless sensor.

TABLE 1

Parameters used in the oscillator simulation

| | |
|---|---|
| Feedback inductor | $L_1$ = 1 mH |
| Bias inductor | $L_2$ = 10 mH |
| Capacitor | $C_1$ = 3.3 nF |
| Capacitor | $C_2$ = 16 nF |
| Load resistance | $R_L$ = 0.5 MΩ |
| Feedback resistance | $R_{bias}$ = 50 Ω |

During the design of the oscillator, some key features have been realized which may be considered when designing an oscillator. The power consumption of an oscillator can be made arbitrarily low by decreasing the capacitive divider ratio and increasing the quality factor (Q) of the feedback inductor. It is found out that the rectified DC voltage depends on the diode parameters, input power and load impedance. Oscillator output voltage depends on the rectified DC voltage, oscillator circuit topology, and quality factor and characteristic impedance of the resonator. Moreover, power consumption by an oscillator can be made arbitrarily small by decreasing the capacitive divider ratio. Furthermore, modulated reflected power of the sensor depends on mixer diode parameters, input power of the sensor and output voltage of the oscillator.

It will be obvious to a person skilled in the art that the inventive concept can be implemented in various obvious alternative ways. The invention and its embodiments are not limited to the examples described above but may vary within the scope of the claims.

The invention claimed is:

1. A passive wireless transponder, comprising:
an antenna,
a rectifier to convert a RF power of a received radio frequency (RF) interrogating signal into a direct current (DC),
a tag oscillator configured to generate a modulation frequency and an internal clock, a demodulator adapted to demodulate a received RFID interrogating command from the received RF interrogating signal, a digital control part that uses the internal clock and is adapted to process the received RFID interrogating command and to output a digital response,
a modulator adapted to generate a modulated backscattered signal carrying the digital response for communication with a backscattering principle to provide radio frequency identification (RFID) features, and
a sensing element for sensing a predetermined variable, wherein the modulated backscattered signal carrying a digital response comprises sidebands that are offset from an interrogation frequency by a modulation frequency outputted from the tag oscillator, and wherein the tag oscillator is based on a resonator, and the sensing element is connected to the tag oscillator to load the tag oscillator, and the modulation frequency outputted from the tag oscillator and thereby the offset of the sidebands of the modulated backscattered signal are arranged to be dependent on and carry a sensed value of the predetermined variable.

2. A passive wireless transponder according to claim 1, wherein the sensing element further comprises a control logic and/or a memory for radio frequency identification (RFID) features.

3. A passive wireless transponder according to claim 2, wherein the radio frequency identification (RFID) features comprise identification and anti-collision.

4. A passive wireless transponder according to claim 1, wherein major part of the transponder is implemented with integrated circuit technique, and wherein the sensing element is an external component.

5. A passive wireless transponder according to claim 1, wherein the transponder comprises a plurality of sensing elements selectively, one at a time, enabled to load the tag oscillator such that the modulation frequency output from the tag oscillator is dependent on a sensed value of the predetermined variable of the enabled sensing element.

6. A passive wireless transponder according to claim 5, wherein the transponder comprises a selection means arranged to selectively enable one and disable the remaining ones of the plurality of sensing elements according to a predetermined sequence or according to a command received from a reader device.

7. A passive wireless transponder according to claim 1, wherein major part of the transponder is implemented with an integrated circuit technique, and wherein at least part of the tag oscillator comprises an external component.

8. A passive wireless transponder according to claim 7, wherein the external component is an external resonator.

9. A passive wireless transponder according to claim 1, wherein major part of the transponder is implemented with an integrated circuit technique, and wherein the sensing element and a resonator part of the tag oscillator are implemented with a resonant sensor or a MEMS resonant sensor.

10. A passive wireless transponder according to claim 1, wherein the tag oscillator based on a resonator comprises one of a LC oscillator, a RLC oscillator, a crystal oscillator, and an oscillator based on a MEMS (microelectromechanical systems) resonator, a SAW (surface acoustic wave) resonator, or a BAW (bulk acoustic wave) resonator.

11. A passive wireless transponder according to claim 1, wherein the tag oscillator is one of Collpitts oscillator, Meissner oscillator, Armstrong oscillator, and Hartley oscillator.

12. A passive wireless transponder according to claim 1, wherein the tag oscillator is a Collpitts LC or RLC oscillator which comprises an active amplifying device, a capacitive divider, and a feedback inductance.

13. A passive wireless transponder according to claim 12, wherein a voltage level of the modulation frequency output from the LC or RLC oscillator is dependent of a capacitive divider ratio of the capacitive divider.

14. A passive wireless transponder according to claim 1, comprising one or more of a high pass filter between the antenna and the rectifier, a low pass filter between a DC output of the rectifier and an input of the oscillator, and a band pass filter between an output of the oscillator and an input of the modulator.

15. A passive wireless transponder according to claim 1, wherein the rectifier comprises a rectifier diode D1, and wherein the rectifier diode also provides a mixer of the modulator.

16. A system comprising
an RFID reader, and
at least one passive wireless transponder that further comprises:
an antenna,
a rectifier to convert a RF power of a received radio frequency (RF) interrogating signal into a direct current (DC),
a tag oscillator configured to generate a modulation frequency and an internal clock, a demodulator adapted to demodulate a received RFID interrogating command from the received RF interrogating signal, a digital control part that uses the internal clock and is adapted to process the received RFID interrogating command and to output a digital response, a modulator adapted to generate a modulated backscattered signal carrying the digital response for communication with a backscattering principle to provide radio frequency identification (RFID) features, and a sensing element for sensing a predetermined variable, wherein the modulated backscattered signal carrying a digital response comprises sidebands that are offset from an interrogation frequency by a modulation frequency outputted from the tag oscillator, and wherein the tag oscillator is based on a resonator, and the sensing element is connected to the tag oscillator to load the tag oscillator, and the modulation frequency outputted from the tag oscillator and thereby the offset of the sidebands of the modulated backscattered signal are arranged to be dependent on and carry a sensed value of the predetermined variable.

* * * * *